United States Patent Office 3,471,508
Patented Oct. 7, 1969

3,471,508
5-ARYL (OR HETEROAROMATIC) BENZAZOLES
Lewis H. Sarett, Princeton, and Horace D. Brown, Plainfield, N.J., assignors to Merck & Co., Inc., Rahway, N.J., a corporation of New Jersey
No Drawing. Continuation-in-part of application Ser. No. 332,861, Dec. 23, 1963, which is a continuation-in-part of application Ser. No. 321,683, Nov. 6, 1963. This application Mar. 3, 1967, Ser. No. 620,245
Int. Cl. C07d *91/44, 85/48;* A61k *27/00*
U.S. Cl. 260—302
20 Claims

ABSTRACT OF THE DISCLOSURE

New benzazoles such as benzimidazoles, benzoxazoles and benzothiazoles which have aryl or heteroaromatic substituents attached to the 5- or 6-position are disclosed as well as methods for making such compounds. There are also disclosed the methods of using such compounds and compositions containing them in the treatment and prevention of helminthiasis.

---

Related applications.—This application is a continuation-in-part of our copending application Ser. No. 332,861 filed Dec. 23, 1963, now abandoned which in turn is a continuation-in-part of application Ser. No. 321,683 filed Nov. 6, 1963, now abandoned. It is also a continuation-in-part of our pending application Ser. No. 332,844 filed Dec. 23, 1963, now abandoned which in turn is a continuation-in-part of our application Ser. No. 324,845 filed Nov. 19, 1963, now abandoned.

The infection know as helminthiasis involves infestation with various species of parasitic worms of the animal body, particularly the gastrointestinal tract. It is a common, widespread and serious disease, methods for the treatment and prevention of which have not been entirely satisfactory. It is one object of the present invention to provide novel compounds. It is a further object to provide methods of synthesizing such compounds. It is a still further object of this invention to provide a method for preparing anthelmintic compositions containing such compounds. It is another object of this invention to provide a group of substituted benzimidazoles, benzoxazoles and benzothiazoles which are effective in controlling helminthiasis. Still another object of this invention is to provide anthelmintics particularly useful against ascarids. Other objects will become apparent from the following description of the invention.

According to the instant invention, it has now been found that certain benzimidazoles, benzoxazoles and benzothiazoles having at the 2-position a heterocyclic group containing nitrogen, oxygen and/or sulfur as the hetero atoms, and more particularly those further substituted at the 5- or 6-position on the benzazoles nucleus with a heteroaromatic radical or an aryl radical such as phenyl or substituted phenyl, have anthelmintic activity, and that some of them have a surprising degree of activity against swine ascarids.

Among the helmintic parasites, the methods of the genera Haemonchus, Trichostrongylus, Ostertagia, Nematodirus, Cooperia, Bunostomum, Oesophagostomum, Chabertia, Trichuris, Ascaris, Capillaria, Heterakis and Ancylostoma are the most common parasites of domestic animals. The diseases attributable to such infestions, such as ascariasis, trichostrongylosis and gross parasitism, are very widespread and serious, the diseased host usually suffering from such conditions as malnutrition, anemia and hemorrhaging. Moreover, more advanced and uncontrolled cases of helminthiasis can lead to prostration and death.

In general, the compounds of this invention have a surprisingly high degree of activity against the parasitic roundworm *Ascaris lumbricoides* var. *Suum.* Many of these compounds have displayed a higher degree of activity against ascarids than commercially used anthelmintics. The aforementioned ascarid presents a serious economic problem in swine production, and death, stunting or other permanent injury to the host are a common result of infection.

The adult worm inhabits the small intestines of the hog. The large number of eggs laid daily are passed out in the feces of the infected animal and continue to develop until ingested. The larvae then hatch, work their way to the blood stream, migrate to the liver, lungs and other organs and again find their way to the intestines where they mature. The liver and kidneys may show intensive changes because of the passage of the larvae through them.

The novel compounds within the scope of this invention may be represented by the formula

I where R is a heteroaromatic radical containing from 1–3 hetero atoms wherein the hetero atoms are nitrogen, oxygen or sulfur, $R_5$ and $R_6$ are heteroaromatic radicals containing from 1–3 hetero atoms wherein the hetero atoms are nitrogen, oxygen or sulfur, hydrogen, naphthyl, phenyl, halophenyl, loweralkylphenyl, loweralkoxyphenyl, loweralkylthiophenyl, loweralkylaminophenyl or diloweralkylaminophenyl, and provided one and only one of $R_5$ and $R_6$ is hydrogen; and A is oxygen, sulfur or $NR_1$, where $R_1$ is hydrogen, loweralkyl, aralkyl or acyl.

The new and novel compounds of this invention have either a heterocyclic or an aryl substituent at either the 5- or 6-position of the benzazole nucleus. Preferred among the heterocyclic substituents are 5-membered monocyclic heteroaromatics having from 1–3 hetero atoms, these hetero atoms being nitrogen, oxygen and/or sulfur. Heteroaromatic radicals containing nitrogen, such, as imidazolyl and pyrryl, containing oxygen such as furyl, containing sulfur, such as thienyl, and those containing nitrogen and sulfur, such as thiazolyl, isothiazolyl and thiadiazolyl, represent examples of those substituents according to this invention which are located at the 5- or 6-position on the benzazole nucleus. As illustrative of heteroaromatic radicals which may be present at the 5- or 6-position on the benzazole nucleus, there may be mentioned 1′-imidazolyl, 2′ - thiazolyl, 4′ - thiazolyl, 4′ - isothiazolyl, 4′ - 1,2,5-thiadiazolyl, 2′-thienyl, 3′-thienyl, 2′-furyl and 2′-pyrryl.

The aryl substituent may be a monocyclic aryl radical such as phenyl or substituted phenyl, or it may be bicyclic of the type represented by naphthyl or substituted naphthyl. Of these, the compounds having a monocyclic aryl substituent are preferred. Examples of aryl and substituted aryl radicals which may be present at the 5- or 6-position of the benzazoles of Formula I above are phenyl, p-fluorophenyl, o-chlorophenyl, o-fluorophenyl, p-bromophenyl, p-methoxyphenyl, m-methoxyphenyl, o-ethoxyphenyl, p-isopropoxyphenyl, p-tolyl, o-tolyl, p-ethylphenyl, m-methylthiophenyl, o-ethylthiophenyl, p-dimethylaminophenyl, p-diethylaminophenyl, o-methylaminophenyl, p-isopropylaminophenyl, o,p-difluorophenyl, o,p-dimethylphenyl and the like. Where a substitutent is present in the 5-phenyl or 6-phenyl radical, it is preferred that it be in the para position with respect to the point of attachment to the benzazole nucleus.

Among the substituents which may be present at the 5- or 6-position on the benzazole nucleus, phenyl and parafluorophenyl are preferred.

In addition to having a heterocyclic or aryl substituent at the 5- or 6-position, the benzazoles of this invention also have a heterocyclic radical at the 2-position (R in Formula I). It is preferred that this be a monocyclic heteroaromatic 5- or 6-membered ring that contains from 1–3 hetero atoms. The hetero atoms are oxygen, sulfur and/or nitrogen. Examples of such heterocyclic radicals are those containing only nitrogen such as pyrryl and pyridyl, those containing oxygen such as furyl, and those containing sulfur such as thienyl. The preferred compounds of the invention are those wherein the 2-substituent contains nitrogen and sulfur as hetero atoms, e.g., thiazolyl, isothiazolyl and thiadiazolyl.

At the 1-position of the benzimidazole nucleus there may be present alkyl, aralkyl or acyl radicals and the like. Among the alkyl radicals, lower alkyl such as methyl, ethyl, n-propyl and isopropyl are preferred whereas among the acyl radicals, alkanoyl radicals such as acetyl and propionyl, aroyl radicals such as benzoyl and toluoyl and aralkanoyl radicals such as phenacetyl are preferred. Benzyl is the preferred aralkyl radical which may be present at the 1-position.

When both nitrogen atoms on the benzimidazole nucleus are unsubstituted, one skilled in the art will appreciate that the hydrogen atom attached to one of the two nitrogen atoms in the ring will fluctuate between them creating a tautomeric molecule in which the 5- and 6-positions of the ring become equivalent. It is customary to describe these particular compounds as, for instance, a 5(6)-(4'-thiazolyl) benzimidazole or a 5(6)-(1'-imidazolyl) benzimidazole.

As illustrative of the novel substituted benzimidazoles, benzoxazoles and benzothiazoles falling within the scope of our invention and which may be prepared according to the methods described hereinbelow, there may be mentioned 2-(2'-thiazolyl)-5(6)-(4'-thiazolyl) benzimidazole,
2-(4'-isothiazolyl)-5(6)-(1'-imidazolyl) benzimidazole,
2-(2'-thiazolyl)-5(6)-(2'-furyl) benzimidazole,
2-(2'-furyl)-5(6)-(2'-thiazolyl) benzimidazole,
2-(4'-thienyl)-5(6)-(4'-isothiazolyl) benzimidazole,
2-(2'-pyrryl)-5(6)-(2'-thienyl) benzimidazole,
2-(4'-thiazolyl)-5(6)-(1'-imidazolyl) benzimidazole,
2-(4'-thiazolyl)-5-(2'-pyrryl) benzoxazole,
2-(2'-pyrryl)-6-(4'-1,2,3-thiadiazolyl) benzoxazole,
2-(4'-1,2,3-thiadiazolyl)-5-(4'-thiazolyl) benzoxazole,
2-(4'-thienyl)-5-(2'-thiazolyl) benzoxazole,
2-(4'-thiazolyl)-5-(2'-thienyl) benzoxazole,
1-acetyl-2-(3'-pyridyl)-5-(4'-1,2,5-thiadiazolyl) benzimidazole,
2-(2'-thiazolyl)-5(6)-(3'-thienyl) benzimidazole,
2-(2'-furyl)-6-(1'-imidazolyl) benzothiazole,
1-benzoyl-2-(4'-thiazolyl)-5-(2'-thiazolyl) benzimidazole,
2-(4'-thiazolyl)-5(6)-phenyl benzimidazole,
2-(4'-isothiazolyl)-5(6)-phenyl benzimidazole,
2-(2'-thiazolyl)-5(6)-phenyl benzimidazole,
2-(2'-furyl)-5(6)-phenyl benzimidazole,
2-(4'-thienyl)-5(6)-phenyl benzimidazole,
2-(2'-pyrryl)-5(6)-phenyl benzimidazole,
2-(4'-thiazolyl)-5(6)-(4'-fluorophenyl) benzimidazole,
2-(4'-thiazolyl)-5-phenyl benzoxazole,
2-(4'-pyrryl)-6-phenyl benzoxazole,
2-(2'-furyl)-5-phenyl benzoxazole,
2-(4'-thienyl)-5-phenyl benzoxazole,
2-(4'-thiazolyl)-5-(4'-fluorophenyl) benzoxazole,
1-acetyl-2-(3'-pyridyl)-5-(4'-methylphenyl) benzimidazole,
2-(4'-thiazolyl)-5(6)-(4'-methoxyphenyl) benzimidazole,
2-(2'-furyl)-6-phenyl benzothiazole,
1-benzoyl-2-(2'-thiazolyl)-5-phenyl benzimidazole,
and the like.

According to one process for the preparation of the compounds described by Formula I above and more specifically according to one process for the preparation of the benzimidazoles, such compounds may be prepared by reacting an appropriately substituted o-phenylenediamine and a heterocyclic carboxylic acid or derivative thereof such as the acid halide, nitrile, ester or amide in a mineral acid such as sulfuric, phosphoric or hydrochloric acid. The process is carried out at temperatures of from about 120–180° C. for about 3–10 hours. The optimum time and temperature will, of course, depend to some extent upon the particular reactions involved. Benzene, toluene, xylene, and the like, may be used as solvents for one or more of the reactants.

Equimolar amounts of the heterocyclic compound and the diamine are preferred, and from about 5–20 parts by weight of acid/part of heterocyclic compound is desired. It will be appreciated that the relative amounts of acid is not critical. The desired benzimidazoles are recovered by cooling the reaction mixture and diluting it with water. Where the benzimidazoles do not readily crystallize after the above treatment, they are precipitated by treating the quenches mixture with a base.

According to another process for preparing the 5- or 6-substituted benzimidazoles of this invention, the novel compounds may be synthesized by reacting an appropriately substituted nitroaniline with a heterocyclic carboxylic acid or the corresponding ester or acid halide thereof, in a suitable inert solvent such as pyridine, benzene and the like. The nitro group on the resulting anilide is then reduced and benzimidazole formation effected by treatment of said anilide with a reducing system such as zinc-hydrochloric acid, zinc-acetic acid, iron-hydrochloric acid and the like or by catalytic reduction.

Additionally, an appropriately substituted aniline such as 2-(2'-thienyl) aniline or m-phenyl aniline may be reacted with a carboxylic acid or a derivative thereof and subsequently nitrated and reduced to give a second amino substituent. The resulting o-phenylenediamine may then be converted to the desired benzimidazole as hereinabove described.

Alternatively, the benzimidazoles of this invention may be prepared by reacting an appropriately substituted o-phenylenediamine and a heterocyclic carboxylic acid or derivative thereof in polyphosphoric acid, preferably at temperatures of about 175–275° C. for about 2–6 hours.

The substituted benzimidazoles may also be synthesized by reacting an o-phenylenediamine and a heterocyclic aldehyde such as thiazolyl-4-aldehyde, furyl-2-aldehyde, and the like in a reaction medium comprising nitrobenzene. Good results are obtained by heating the reaction mixture to reflux temperature for a short period of time. If desired, a solvent such as a lower alkanol may be used to promote the solubility of the reactants at lower temperatures. Such solvents are allowed to distill off during the heating period. The substituted benzimidazoles in many cases crystallize directly on cooling the nitrobenzene solution. Alternatively, they may be crystallized by addition of ether or petroleum-ether.

According to another process for making the benzimidazoles of the invention, an appropriately substituted ani- of a heterocyclic aldehyde with an appropriately substituted o-phenylenediamine. The reaction is preferably brought about in a suitable solvent such as a lower alkanol. The intermediate product is the Schiff base of the aldehyde and the amine. Normally, this is not isolated but rather converted directly to the benzimidazole. The ring closure of the Schiff base to the benzimidazole is effected with a suitable oxidizing agent such as cupric acetate, lead tetraacetate, mercuric acetate, air and the like.

Where a heavy metal reagent is used to bring about benzimidazole formation from an o-phenylenediamine in the above process, an insoluble heavy metal salt of the 2-heterocyclic benzimidazole is formed. This material is readily converted to the free benzimidazole by removal of the heavy metal salt by reagents suitable to this purpose such as hydrogen sulfide, ammonium polysulfide, ammonium hydroxide and the like.

According to another process for making the benzimidazoles of the invention, an appropriately substituted aniline may be reacted with a heterocyclic nitrile in the presence of a suitable catalyst such as AlCl$_3$ to form an N'-phenylamidine derivative of the heterocyclic compound. Treatment of this latter substance with hydroxylamine to produce an N'-phenyl-N-hydroxyamidine derivative and reaction of this latter substance with an alkyl or aryl sulfonyl halide and then a base will produce the benzimidazole.

Still another method of preparing the benzimidazoles of this invention is that process by which the N'-phenylamidine described in the preceding paragraph is chlorinated or brominated to produce a N-chloro or N-bromo-N'-phenylamidine. This halogenation is brought about by reacting said N'-phenylamidine with a positive halogenating agent capable of halogenating the nitrogen atom of the amidine group. Suitable reagents for this purpose are N-haloamides or N-haloimides, for instance, N-chlorosuccinimide, N-bromoacetamido and the like. When an N-haloamide or N-haloimide is used, a base in a sufficient amount to neutralize the acid addition salt of the N'-phenylamidine is employed. Suitable for this purpose is an alkali metal carbonate or hydroxide.

The preferred halogenating agents, however, are hypochlorous and hypobromous acid. These are conveniently formed in situ by addition of an alkali or alkaline earth metal hypohalite to a solution of the N'-phenylamidine acid addition salt, whereby neutralization of the acid addition salt and generation of the halogenating agent occur concurrently. Typical hypohalites useful for this purpose are sodium or potassium hypochlorite, sodium hypobromite and calcium hypobromite.

The N-halo-N'-phenyl amidine resulting from the above halogenation is converted to the benzimidazole by treatment with a base, such as an alkali or alkaline earth metal hydroxide such as sodium hydroxide, potassium hydroxide or calcium hydroxide.

One method of obtaining the 1-substituted benzimidazole of Formula I above is by converting the non-1-substituted compound to an alkali metal salt, preferably the sodium salt, by intimately contacting said compound with sodium hydride in a suitable solvent. A slight molar excess of sodium hydride gives satisfactory results and equimolar quantities of benzimidazole and sodium hydride may also be used if desired. The reaction is conveniently brought about by warming the reactants at slightly elevated temperatures, but room temperature gives satisfactory results.

A 1-substituted benzimidazole may then be obtained by contacting the benzimidazole alkali metal salt with an acyl halide such as benzoyl chloride, acetyl chloride, acetyl bromide, propionyl chloride and the like, an aralkyl halide such as benzyl chloride, or an alkyl halide, such as methyl chloride, ethyl chloride, methyl bromide and the like. Normally, the acyl halide, aralkyl halide or alkyl halide are added directly to a solution or suspension of the benzimidazole salt in an inert solvent and the reaction is allowed to proceed at a temperature of from about room temperature up to 100° C. Reaction temperatures in the range of 50–75° C. are preferred. The solvent employed as the reaction medium is preferably a hydrocarbon solvent such as benzene, toluene, xylene, petroleum ether and the like either alone or mixed with other solvents miscible therewith such as dimethylformamide.

The 5- and 6-substituted benzoxazoles and benzothiazoles of this invention are obtainable in a variety of ways. One method comprises reaction of an appropriately substituted o-aminophenol or o-aminothiophenol with a heterocyclic carboxylic acid or derivative thereof, such as an acid halide, ester, amide or nitrile. Reaction is carried out by intimately contacting the two materials in substantially equimolar amounts at elevated temperatures. The benzoxazole or benzothiazole is obtained by mixing the reactants either in or in the absence of an organic solvent medium. Presence of a solvent is preferred. An aromatic hydrocarbon such as benzene, toluene or xylene is satisfactory for this purpose. The process is conveniently carried out at a temperature of from about 70–120° C. When formation of the desired benzothiazole or benzoxazole is complete, the product may be isolated and purified by known methods such as by removal of the solvent under reduced pressure and either recrystallization or sublimation of the desired compound.

An additional method for making the benzoxazoles and benzothiazoles of the invention consists of the reaction of an appropriately substituted o-aminophenol or o-aminothiophenol with a heterocyclic carboxylic acid or a derivative thereof in a reaction medium comprising polyphosphoric acid. This process is particularly satisfactory for synthesizing the benzothiazoles and is preferably carried out by intimately contacting approximately equimolar amounts of the reactants in a medium comprising 5–20 parts by weight of polyphosphoric acid per part of carboxylic acid or its derivatives. The reaction is brought about by heating the mixture at temperatures of 150–215° C., preferably 180–200° C., for 2 to 4 hours. The benzothiazoles are then isolated by quenching the cooled reaction mixture with water and neutralizing the acid with a base such as calcium carbonate, an alkali metal hydroxide or carbonate, or ammonium hydroxide. This method is considered less satisfactory for making the benzoxazole compounds than the one previously described inasmuch as said benzoxazoles are less stable in the presence of hot mineral acid than are the corresponding benzothiazoles.

Still another method for synthesizing the benzoxazoles and benzothiazoles of this invention comprises the reaction of an appropriately substituted o-aminophenol or o-aminothiophenol with a heterocyclic aldehyde in a solvent such as a lower alkanol. The reaction proceeds to form the corresponding benzoxazoline or benzothiazoline, this compound then being converted to the benzoxazole or benzothiazole by oxidation with ferric chloride, lead tetraacetate, cupric acetate, mercuric acetate and the like.

The substituted benzimidazoles, benzoxazoles and benzothiazoles described hereinabove are useful in the treatment and/or prevention of helminthiasis in domesticated animals. For this purpose, they may be administered orally as a component of the animal feed stuff, in the drinking water, in salt blocks, and in unit dosage forms such as boluses and drenches. The amount of active ingredient required for optimum control of helminthiasis, of course, varies in accordance with such factors as the particular compound employed, the species of animal to be treated, the species of infecting parasite, the severity of infection, and whether the compound is employed therapeutically or prophylactically. Generally, certain classes of the compounds of this invention have activities differing from those in other classes. For instance, the benzimidazoles of this invention generally exhibit greater activity than the corresponding benzoxazoles and benzothiazoles. In general, the compounds described herein when administered orally to domestic animals in daily doses of from about 0.1 mg. to about 500 mg. per kilogram of animal body weight are highly effective in controlling helminthiasis without intolerable toxic effect. When the compounds are to be employed as therapeutic agents, good results are obtained when the animals are fed a daily dose of from about 5 mg. to about 500 mg. and preferably 15 mg. to 250 mg. per kilogram of body weight. Administration may be in a single dose or divided into a plurality of smaller doses over a period of 24 hours. Where prophylactic treatment is desired and the compounds are fed continuously, satisfactory results are obtained when the animal's ingest daily dosages are from about 0.1 mg. to 100 mg. per kilogram of body weight.

The compounds of this invention, when prepared as a unit dosage form such as a capsule, tablet, bolus, drench and the like, may be blended with one or more innocuous orally ingestible ingredients including diluents, fillers, binders, lubricants, disintegrating agents, suspending agents, wetting agents and the like. Suspending agents are particularly valuable when a drench is desired and should be used in such amount as to permit a uniform suspension of the active ingredient in water. The exact quantity of suspending agent to be employed will depend upon the concentration of active anthelmintic ingredient and the particular suspending agent being utilized.

The unit dosage forms may be readily prepared by conventional formulating techniques and are particularly useful when administration is to be made in a single dose or divided doses over a period of 24 hours. In addition to the earlier mentioned ingredients, the solid compositions may also contain a material which when associated with the active ingredient maintains the active ingredient in inert or inoperative form so long as the composition remains in the acidic stomach, but which releases the active ingredient when the composition reaches the intestine. Such compositions, because enteric in character, are particularly useful for the treatment of animals suffering from severe helmintic infection of the intestinal tract. Provision of such enteric property can, for example, be accomplished by coating tablets and boluses in a conventional manner with one of the commonly employed enteric coatings such as those containing fatty acids, resins, waxes, synthetic polymers and the like.

The exact amount of active ingredient to be employed in the above compositions may vary provided with a sufficient amount is ingested to give the required dosage. In general, tablets, boluses and drenches containing from about 5 to 70% by weight of active ingredient may be satisfactorily employed to supply the desired dosage. A typical example of a bolus which may be used in accordance with the teaching of the invention is as follows:

| | Gm. |
|---|---|
| 2-(4'-thiazolyl) - 5(6)-(1'-imidazolyl) benzimidazole | 6.0 |
| Dicalcium phosphate | 1.0 |
| Starch | 0.7 |
| Guar gum | 0.16 |
| Talc | 0.11 |
| Magnesium stearate | 0.028 |

Another suitable composition for a bolus would be:

| | Gm. |
|---|---|
| 2-(4'-thiazolyl) - 5(6)-phenyl benzimidazole | 6.0 |
| Dicalcium phosphate | 1.0 |
| Starch | 0.7 |
| Guar gum | 0.16 |
| Talc | 0.11 |
| Magnesium stearate | 0.028 |

This bolus is prepared by thoroughly mixing the benzimidazole of the particle size finer than 60 mesh with 0.43 gm. of starch in the form of an aqueous starch paste. The resulting mixture is then granulated in the usual manner, passed through a No. 10 mesh screen and dried at about 40–50° C. for about 8 hours. The dried material is then passed through a No. 16 mesh screen after which the guar gum and the balance of the starch are added and the mixture thoroughly blended. The remainder of the ingredients are then added and the entire mass totally mixed. A bolus of the desired size is then prepared in a standard manner by means of compression.

A suitable drench would contain the following ingredients in about an ounce of drench composition:

| | | |
|---|---|---|
| 2-(2' - furyl)-5(6) - (4' - thiazolyl) benzimidazole | gm. | 4.5 |
| Benzalkonium chloride | ml. | 0.6 |
| Antifoam emulsion | gm. | 0.06 |
| Hydroxyethylcellulose | gm. | 0.3 |
| Sodium phosphate monobasic | ml. | 0.3 |
| Water | ml. To | 30.0 |

Yet another suitable drench would contain the following ingredients in about an ounce of drench composition:

| | | |
|---|---|---|
| 2 - (2' - furyl - 5(6)-(4' - fluorophenyl) benzimidazole | gm. | 4.5 |
| Benzalkonium chloride | ml. | 0.6 |
| Antifoam emulsion | gm. | 0.06 |
| Hydroxyethylcellulose | gm. | 0.3 |
| Sodium phosphate monobasic | ml. | 0.3 |
| Water | ml. To | 30.0 |

The levels of anthelmintic in these unit dosage forms may be varied within reasonable limits without altering the amounts of the other ingredients in the composition.

The benzimidazoles, benzoxazoles and benzothiazoles of this invention may be administered, dispersed in or admixed with the normal elements of animal sustenance, i.e., the feed, drinking water or other liquids normally partaken by the animals. This method is preferred when it is desired to administer the active compounds continuously, either as a therapeutic or prophylactic agent, for a period of several days or more. However, in such usage, it is to be understood that the present invention also contemplates the employment of compositions containing the active compounds intimately dispersed in or admixed with any other carrier or diluent which is inert with respect to the active ingredient, orally administrable and is tolerated by the animals. Such compositions may be utilized in the form of powders, pellets, suspensions and the like and are adapted to be fed to animals to supply the desired dosage or to be employed as concentrates or supplements and subsequently diluted with additional carrier or feed to produce the ultimate composition. Examples of carriers or diluents suitable for such compositions are solid orally ingestible carriers such as distillers' dried grains, alfalfa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In the preparation of solid compositions the active ingredient is intimately dispersed or admixed throughout the feed or other solid carrier by methods such as grinding, stirring, milling or tumbling. By selecting proper diluents and by altering the ratio of carrier to active ingredient, compositions of any desired concentration may be prepared.

As previously stated, the 5- and 6-substituted benzazoles of the invention in general have an unusually high degree of activity against swine ascarids such as *Ascaris lumbricoides*. When anthelmintics such as those of the present invention are used for treating animals such as swine and particularly when the treatment is for the purpose of preventing on freeing the host from ascarid infestation, the active agents are preferably administered as an ingredient of the feed. Where the compounds described according to Formula I above are provided as a constituent of the feed, the required dosage may be supplied with feed compositions containing from about 0.001%–3% by weight of the active compound. Such medicated feed compositions can be prepared for direct use by mixing the above amount of active ingredient directly with the feed. The medicated feeds may also be prepared by the use of feed supplements containing higher concentrations of the active ingredient uniformly dispersed in a solid edible carrier such as mentioned above. The feed supplements may then be diluted with the feed to produce the desired concentration of active ingredient for feed. Since it is convenient for the feed manufacturer to use about one pound of feed supplement for each ton of finished feed, the preferred concentration of active ingredient in the feed supplement is partly a function of the level of active ingredient desired in the finished feed. In general, feed supplements containing from about 5% to about 50% by weight of active ingredient may be satisfactorily employed to supply the desired dosage in the finished feed.

Examples of typical feed supplements containing the active compounds dispersed in a solid inert carrier are:

|     | Lbs. |
| --- | --- |
| (A) 2-4'-thiazolyl) - 5(6)-(2'-thiazolyl benzimidazole | 5 |
| Wheat shorts | 95 |
| (B) 2-(4'-thiazolyl) - 5(6)-(1'-imidazolyl) benzimidazole | 15 |
| Ground oyster shells | 40 |
| Citrus meal | 45 |
| (C) 2-(2'-furyl) - 5(6) - (4'-thiazolyl) benzimidazole | 25 |
| Corn meal | 75 |
| (D) 2-(2'-thienyl - 5(6) - (2'-thienyl) benzimidazole | 30 |
| Soybean mill feed | 70 |
| (E) 2-(4'-thiazolyl) - 6-(2'-furyl) benzothiazole | 15 |
| Molasses solubles | 85 |
| (F) 2-(4'-thiazolyl) - 5(6)-(4'-fluorophenyl) benzimidazole | 5 |
| Wheat shorts | 95 |
| (G) 2-(4'-thiazolyl)-5(6)-phenyl benzimidazole | 15 |
| Ground oyster shells | 40 |
| Citrus meal | 45 |
| (H) 2-(2'-furyl)-5(6) - methoxyphenyl benzimidazole | 25 |
| Corn meal | 75 |
| (I) 2-(2'-thienyl)-5(6)-phenyl benzimidazole | 30 |
| Soybean mill feed | 70 |
| (J) 2-(4'-thiazolyl)-6-phenyl benzothiazole | 15 |
| Molasses solubles | 85 |

In the preparation of these and similar feed supplements, the active ingredient is added to the carrier and the whole mixed to give substantially uniform dispersion of the anthelmintic agent in the carrier.

The examples following are given for the purpose of illustration and not by way of limitation.

EXAMPLE 1

2-(4'-Thiazolyl)-5(6)-(4'-fluorophenyl) benzimidazole

A mixture of 2.56 gm. (0.02 mole) of thiazole-4-carboxylic acid, 100 ml. of toluene, and 3.2 gm. (0.027 mole) of thionyl chloride is refluxed for 2 hours. It is then added to a solution of 3.26 gm. (0.02 mole) of 4-amino-4'-fluorobiphenyl in 100 ml. of toluene and 100 ml. of pyridine. This mixture is stirred and refluxed for 2 hours, and poured onto crushed ice containing an excess of hydrochloric acid. Benzene is added to dissolve the solid that formed. The layers are separated, and the organic phase is washed with an aqueous solution of sodium bicarbonate, dried and concentrated to about 200 ml. The residue is diluted with about 1.5 l. of petroleum benzene and the precipitate is filtered. The yield of 4-fluorophenyl-N - 4' - thiazolecarbonylanilide, M.P. 212–213° C., is 4.3 gm. (72%).

A solution of 6.8 gm. (0.0225 mole) of p-fluorophenyl-N-4'-thiazolecarbonylanilide in 250 ml. of glacial acetic acid and 125 ml. of acetic anhydride is treated at 50° C. with 3.1 gm. (0.045 mole) of fuming nitric acid. In a few minutes the product begins to separate as a yellow solid. The temperature is maintained at 50° C. for 1 hour, and the mixture is then allowed to cool to room temperature. The solid is filtered, washed and dried. The yield of o-nitro-4-fluorophenyl-N-4'-thiazolecarbonylanilide, M.P. 279° C. (micro sub-stage), is 6.7 gm. (86%).

A suspension of 380 mg. (0.0011 mole) of o-nitro-p-fluorophenyl-N-4'-thiazolecarbonylanilide in 100 ml. of glacial acetic acid is reduced by hydrogen at room temperature and 40 p.s.i. with 0.4 gm. of 5% palladium over Darco as catalyst. The catalyst is filtered and the filtrate is concentrated to dryness at room temperature. The oily residue is digested with ether and petroleum ether, whereupon p-(4 - fluorophenyl)-$N_1$-(4 - thiazolecarbonyl)-o-phenylenediamine crystallizes.

A solution of the p-(4'-fluorophenyl)-$N_1$-(4'-thiazolecarbonyl)-o-phenylenediamine, obtained above, in 30 ml. of ethanol, 5 ml. of water, and 0.6 ml. of concentrated hydrochloric acid is refluxed for 4 hours. The cooled solution is neutralized to pH 8 with ammonia water, and 35–40 ml. of water is added. The solid that formed is filtered, washed and dried. The yield of 2-(4'-thiazolyl-5(6)-(4'-fluorophenyl) benzimidazole, M.P. 200° C. with a transition at 100° C., is 200 mg. (61%).

The compounds of this invention are tested for effectiveness in preventing ascarid infection by feeding groups of ten mice each diets containing varying concentrations of the compound to be tested. After one day on the medicated diets, the mice are inoculated orally with 40,000 larvated eggs of Ascaris lumbricoides var. Suum. The medication is then continued for an additional nine days, at the end of which time the test animals are killed and their lungs examined for signs of hemorrhagic lesions produced by migrating ascarid larvae.

When using the assay procedure hereinabove outlined, this product displayed activity at a concentration of 0.1% in the diet sufficient to allow only detectable to moderate lesions in the infected animal's lungs whereas severe lesions and death occurred in the corresponding infected untreated control animals.

When the above process is carried out using 1,2,3-thiadiazole-4-carboxylic acid in place of thiazole-4-carboxylic acid, 2-(4'-1,2,3 - thiadiazolyl) - 5(6) - (4'-fluorophenyl) benzimidazole results.

Similarly, when isothiazole-4-carboxylic acid, thiazole-2-carboxylic acid or 2-furoic acid is a reactant in the process described above, the resulting product is 2-(4'-isothiazolyl) - 5(6) - (4' - fluorophenyl) benzimidazole, 2-(2'-thiazolyl)-5(6)-(4'-fluorophenyl) benzimidazole or 2-(2' - furyl) - 5(6) - (4' - fluorophenyl) benzimidazole, respectively.

EXAMPLE 2

2-(4'-Thiazolyl)-5(6)-phenyl benzimidazole 18.6 gm. of thiazole-4-carboxylic acid is refluxed with 80 ml. of thionyl chloride until HCl evolution ceases. The mixture is then evaporated to dryness in vacuo and the 4-thiazole carboxylic acid chloride added portionwise, as a solid, to a solution of 30.9 gm. of 3-nitro-4-aminobiphenyl in 150 ml. of dry pyridine at room temperature. The mixture is then heated on the steam bath, with stirring, for about 1 hour. The dark homogeneous solution is poured onto ice. The resulting precipitate is filtered off and washed with water, 2.5 N hydrochloric acid, water, saturated sodium bicarbonate solution and finally with fresh water. The solid is recrystallized from acetone to give N-(2-nitro-4-biphenyl)-4-thiazole carboxamide, M.P. 215–217° C.

14.3 gm. of N-(2-nitro-4-biphenyl)-4'-thiazole carboxamide in 250 ml. of ethanol is reduced with hydrogen at 50° C. using 3 gm. of 5% palladium on charcoal catalyst. The catalyst is then filtered off and washed well with excess boiling ethanol. The combined ethanol solutions are concentrated in vacuo to a volume of about 500 ml. To this solution is added 250 ml. of concentrated hydrochloric acid. A solid precipitates. The mixture is refluxed for 6 hours and then allowed to come to room temperature. The precipitated solid 2-(4'-thiazolyl)-5(6)-phenyl benzimidazole hydrochloride is filtered off and suspended in ethanol. An excess of concentrated ammonium hydroxide is added. A precipitate forms. Ethanol is added until a homogeneous solution forms. The solution is treated with decolorizing charcoal and filtered into a large volume of water. The dark gummy precipitate which forms is recrystallized from ethyl acetate to give 2-(4'-thiazolyl)-5(6)-phenyl benzimidazole, M.P. 216–217° C.

This compound at a concentration of 0.3% in the diet of infected mice permitted merely detectable liver lesions due to ascarids whereas severe lesions and death occurred in the infected untreated control animals.

When the above process is carried out using 1,2,5-thiadiazole-4-carboxylic acid or isothiazole-4-carboxylic acid, there is obtained 2-(4'1,2,5-thiadiazole)-5(6)-phenyl benzimidazole and 2-(4'-isothiazolyl)-5(6)-phenyl benzimidazole, respectively.

EXAMPLE 3

1-benzoyl-2-(4'-thiazolyl)-5-phenyl benzimidazole

To 14 gm. (0.05 mole) of 2-(4'-thiazolyl)-5(6)-phenyl benzimidazole is added sufficient 1:1 benzene dimethylformamide mixture to give substantial solution at gentle reflux. A few ml. of benzene is then distilled to dry hte mixture. 0.055 M of sodium hydride is added to the reaction flask as a suspension in dry benzene. While the reaction mixture is stirred (30 minutes), hydrogen gas evolves and the sodium salt is formed. 7.7 gm. (0.55 M) of benzoyl chloride in 10 ml. of dry benzene is added dropwise to the sodium salt. After 30 minutes of stirring at gentle reflux, the reaction mixture is cooled, diluted with 2 volumes of dry toluene and the organic layer is washed with small portions of cold water. The organic solvent solution is then dried over magnesium sulfate, filtered and concentrated to permit recovery of the desired 1-benzoyl-2-(4'-thiazolyl)-5-phenyl benzimidazole.

If acetyl chloride or benzyl chloride is used in place of benzoyl chloride in the process above, the corresponding 1-acetyl or 1-benzyl benzimidazole will result.

EXAMPLE 4

1-methyl-2-(4'-thiazolyl)-5-phenyl benzimidazole

A solution of 0.05 M of the 1-sodium derivative of 2-(4'-thiazolyl)-5-phenyl benzimidazole (prepared as in Example 3) is treated with 7.8 gm. of methyl iodide in 10 ml. of benzene. After one hour at gentle reflux the solution is poured into water and the aqueous phase is extracted with three ×50 ml. of benzene. The combined benzene solutions are then washed with three ×25 ml. of water, three small portions of 1 N sodium hydroxide, again with water and further concentrated to dryness in vacuo. The 1 - methyl - 2 - (4'-thiazolyl)-5-phenyl benzimidazole thus obtained is purified by recrystallizing from ethyl acetate.

EXAMPLE 5

2-(2'-thiazolyl)-5(6)-phenyl benzimidazole

Thiazole-2-carboxylic acid chloride (14.7 gm., 0.1 mole) is reacted with 21 gm. of 2-nitro-4-phenylaniline in 125 ml. of dry pyridine at room temperature for 30 minutes and then at 75° C. for one hour. The resulting 2 - nitro - 4 - phenyl-(2'-thiazolyl) anilide is then poured onto ice. The resulting precipitate is filtered, washed with water, then with 2.5 normal hydrochloric acid, again with water, then with saturated sodium bicarbonate solutions and finally with fresh water. The solid is then recrystallized from ethyl acetate. The nitroanilide products is reduced with hydrogen at 50° C. using 3 gm. of 5% palladium over Darco. The catalyst is then filtered and washed with hot ethanol. The combined ethanol solutions are combined in vacuo and hydrochloric acid is added at sufficient quantity to precipitate 2-(2'-thiazolyl)-5(6)-phenyl benzimidazole. The product is then filtered and recrystallized from ethyl acetate.

When the above process is carried out using pyridine-3-carboxylic acid chloride instead of thiazole-2-carboxylic acid chloride, there is obtained 2-(3'-pyridyl)-5(6)-phenyl benzimidazole.

EXAMPLE 6

2-(4'-thiazolyl)-5(6)-(4'-methoxyphenyl) benzimidazole

A mixture of 2.56 gm. (0.02 mole) of thiazole-4-carboxylic acid, 100 ml. of toluene and 2.4 gm. (0.02 mole) of thionyl chloride is refluxed for 2 hours. To this mixture is added 4.9 gm. (0.02 mole) of p-(4'-methoxyphenyl)-o-nitroaniline, 100 ml. of toluene, and 40 ml. of pyridine. Refluxing is continued for 2 hours. The reaction mixture is poured into ice and water containing an excess of hydrochloric acid. The mixture is diluted with benzene to dissolve the precipitated solid. The layers are separated and the organic phase washed successively with dilute hydrochloric acid and with aqueous sodium bicarbonate solution. The solution is dried and concentrated to 200 ml., and the residue diluted with a large volume of Skelly Solve B. The precipitate is filtered and recrystallized from 350 ml. of methyl ethyl ketone. The yield of p - (4' - methoxyphenyl)-o-nitro-N-thiazolecarbonylanilide, M.P. 205–207° C., was 4.1 gm. (56%).

A mixture of 0.57 gm. (0.0016 mole) of o-nitro-p-(4'-methoxyphenyl)-N-4'-thiazolecarbonylanilide, 50 ml. of methanol, 0.16 ml. (0.0016 mole) of concentrated hydrochloric acid, and 0.2 gm. of 5% palladium over Darco catalyst is agitated in an atmosphere of hyrogen at 40 p.s.i. at room temperature. When the reduction is complete, the catalyst is filtered and the filtrate concentrated to dryness at reduced pressure. The residue is then used without further treatment.

A solution of about 0.5 gm. of p-(4'methoxyphenyl)-$N_1$-(4-thiazolecarbonyl)-o-phenylenediamine hydrochloride in 40 ml. of ethanol, 6 ml. of water, and 0.6 ml. of concentrated hydrochloric acid is refluxed for 4 hours and allowed to cool. The yield of 2-(4'-thiazolyl)-5(6)-(4'-methoxyphenyl) benzimidazole hydrochloride, M.P. (capillary tube) above 250° C., M.P. (micro-substage) 210–215° C., is 0.3 gm. (55%).

Use of the assay procedure described hereinabove shows that this product is highly effective against *Ascaris lumbricoides* var. *Suum* and permits only detectable liver lesions and no mortality at a concentration of 0.3% in the feed compared to severe lesions and 85% mortality in infected untreated control animals.

When thiazole-2-carboxylic acid is used in place of thiazole-4-carboxylic acid in the above process, there is obtained 2-(2'-thiazolyl)-5(6)-(4'-methoxyphenyl) benzimidazole.

EXAMPLE 7

2-(2'-furyl)-5(6)-phenyl benzimidazole 30 gm. of 3-nitro-4-aminobiphenyl is suspended in 300 ml. of benzene and 50 ml. of pyridine. Stirring for about 15 minutes does not give complete solution. A solution at 25 gm. of crude furoyl chloride in 50 ml. of benzene is added rapidly with stirring. The mixture is warmed with stirring on the steam cone for about 30 minutes.

The mixture is diluted with chloroform until it becomes homogeneous. This solution is washed with water, diluted HCl and filtered. The filtrate is washed with water and with 10% $NaHCO_3$. It is then dried over $MgSO_4$ and concentrated to a residue which crystallizes. The product is recrystallized from Benzene-Skelly Solve B to give two portions having a combined weight of 38 gm. (88%), M.P. 156–158° C.

38 gm. of the anilide formed above is hydrogenated overnight in 4 liters of ethanol (2BA) in the presence of 10 gm. of 5% palladium over Darco. The pressure drop is 13 p.s.i. (calc'd, 11.2). The catalyst is filtered off and the filtrate concentrated to about 1500 ml. 500 ml. of concentrated HCl is added and the solution is treated on the steam cone for two hours. It is cooled and neutralized with 500 ml. concentrated ammonia. After dilution with water and cooling, a precipitate formed and was filtered and washed with water. The moist product weighed 36 gm.

The product is again dissolved in ethanol, made up to 4 N HCl, and refluxed for two hours. After neutralization and precipitation, the product is extracted with chloroform and the solution dried over $MgSO_4$. Analiquot is evaporated to give a crude product. A column of 600 gm. of alumina is prepared in acetone and rinsed with Skelly Solve B. The chloroform solution is put through the column and elution with chloroform gives a satisfactory separation.

The early fractions give a colored oil which does not crystallize. The middle fractions on evaporation and treatment with a little ether give 8.5 gm. of the desired benzimidazole (26.5%), M.P. 185–187° C. After saturation with $H_2S$ the highly colored filtrate is treated with Darco, then filtered and concentrated, yielding a brown gum which is then dissolved in about 100 ml. of ethyl acetate and is passed over 150 gm. of acid-washed alumina. A brown oil is obtained in the second 150 ml. portion of ethyl acetate, which oil slowly crystallizes while standing, yielding 4.9 gm. of the material. Recrystallization from benzene petroleum ether gives a material having a melting point of 190° C.

3.2 gm. portion of this material is dissolved in 50 ml. of ethyl acetate diluted with 100 ml. of ether and run through a column containing 150 gm. of acid-washed alumina. Six 200 ml. cuts of ether remove only trace amounts of a brown gum. A 3 parts ether, 1 part chloroform eluent, gives a light tan glass. The combined fractions of four 200 cc. eluates are converted to the hydrochloride salt. Recrystallization from alcohol-ether yields 2-(2'-pyrryl)-5(6)-phenyl benzimidazole with a melting point of 265–280° C., the broad range resulting from the loss in HCl which occurs readily above 250° C.

EXAMPLE 8

2-(2'-furyl)-5(6)-phenyl benzimidazole

A solution of 3-nitro-4-aminobiphenyl (5.00 gm., 1.0 mole) and freshly distilled furoyl chloride (3.35 gm., 1.1 mole) in pyridine (20 ml.) is refluxed for 15 minutes then poured into an excess of cold water. The precipitate is filtred off, washed with aqueous 5% sodium carbonate and then with water until neutral. After drying under vacuum the product is obtained as a yellow powder (7.18 gm., 99%), M.P. 154–157° C. Crystallization from ethanol yields yellow fluffy needles (6.33 gm.), M.P. 157–160° C. Chromatography and further crystallization of a small portion raises the M.P. to 161–161.5° C. This compound (6.13 gm.) is hydrogenated over 5% palladium over carbon catalyst (3 gm.) in ethanol solution (800 ml.) at 70° C./40 p.s.i. The material is then filtered with supercel and the clear pale yellow solution is made approx. 2 N in HCl by adding aqueous concentrated HCl (200 ml.). The solution is refluxed for 3 hours, then made alkaline with an excess of aqueous concentrated $NH_3$, and the ethanol evaporated on the steam bath at reduced pressure. A brown gum separates and is dried to a foam (6.13 gm.) which is chromatographed in chloroform over alumina. The chloroform eluate yields a pale brown foam (3.80 gm.), M.P. 103–105° C. with effervescence followed by partial recrystallization at about 150° C. and melting about 180° C. This product is melted at about 180° C. over about 30 seconds and the crystalline residue (3.48 gm.) is recrystallized from 15 ml. of ethyl acetate to give off-white powder, 2-(2'-furyl)-5(6)-phenyl benzimidazole (3.11 gm., 59%), M.P. 188° C.

EXAMPLE 9

2-(2'-furyl)-5(6)-(4'-methoxyphenyl) benzimidazole

A solution of 1 gm. of 4-(4'methoxyphenyl) acetanilide in 6 ml. of glacial acetic acid and 6 ml. of acetic anhydride is treated at 50° C. with a solution of 0.35 gm. of fuming nitric acid in 3 ml. of glacial acetic acid over a 15–20 minute period. The temperature is maintained at 50° C. for an additional 15 minutes, and the solution is poured into 150 ml. of water. The crude product, 1 gm. (84%), M.P. 120–130° C., is obtained by filtration. The product is recrystallized from 50 ml. of ethanol and melts at 136–137° C.

A mixture of 0.53 gm. of 4-(4'-methoxyphenyl)-3-nitroacetanilide, 10 ml. of ethanol and 5 ml. of concentrated hydrochloric acid is refluxed for 10 minutes. Solution is obtained and the product then begins to separate. It is filtered, washed and dried. The yield of 4-(4'-methoxyphenyl)-3-nitroaniline, M.P. 166–168° C., is 0.42 gm. (93%). After recrystallization from 30 ml. of ethanol, the product melts at 167.5–168.5° C.

A mixture of 0.31 gm. of 4-(4'-methoxyphenyl)-3-nitroaniline, 10 ml. of toluene, 2 ml. of pyridine, and 0.18 gm. of furoyl chloride is stirred and refluxed for 2 hours. The cooled mixture is washed free of pyridine with dilute hydrochloric acid, and the toluene phase is dried and diluted with 8–9 volumes of petroleum benzene. The yield of 4-(4'-methoxyphenyl)-3-nitro-N-furoylanilide, M.P. 160–166° C. is 0.37 gm. One recrystallization from ethanol raises the melting point of the product to 171–172° C.

A solution of 250 mg. of 4-(4'-methoxyphenyl)-3-nitro-N-furoylanilide, 25 ml. of methanol, 0.07 ml. of concentrated hydrochloric acid, and 0.1 gm. of 5% palladium over Darco catalyst is reduced by hydrogen at 40 p.s.i. and room temperature. The catalyst is filtered and the filtrate concentrated to dryness. The yield of 4-(4'-methoxyphenyl)-$N_1$-(2 - furoyl)-3 - phenylenediamine hydrochloride, M.P. 195–197° C. dec., is 230 mg.

A solution of 200 mg. of 4-(4'-methoxyphenyl)-$N_1$-(2-furoyl)-3-phenylenediamine hydrochloride in 3 ml. of ethanol, 3 ml. of water, and 0.3 ml. of concentrated hydrochloric acid is heated at reflux temperature for 2½ hours. The solution is filtered and allowed to cool, whereupon 100 mg. of 2-(2'-furyl)-5(6)-(4'-methoxyphenyl) benzimidazole hydrochloride, M.P. above 250° C., is obtained; the melting point on the micro substage is 215–220° C.

EXAMPLE 10

2-(4'-thiazolyl)-5-phenyl benzoxazole

A solution of 4.6 gm. (0.025 mole) of 2-amino-4-phenylphenol in 50 ml. of pyridine and 3.4 gm. (0.026 mole) of triazole-4-carboxylic acid is mixed and heated to 60° C. with continuous stirring for 1 hour. The dark green homogeneous mixture is then cooled by pouring onto crushed ice. The white crystals which form upon standing are filtered, washed with water, washed with 5% sodium bicarbonate and washed once again with water. The crude material melts at 225–227° C. Recrystallization from ethyl alcohol gives 3.9 gm. of material, melting point 239–241° C.

The anilide obtained above is combined with 4 gm. of toluene and the mixture is heated to reflux and maintained at reflux for 8 hours during which time water is removed. The solvent is then removed by concentration in vacuo and the residue is washed with 10% sodium bicarbonate. The residue is then triturated with benzene and the benzene solution is dried over sodium sulfate, filtered and concentrated to dryness. Recrystallization from ethyl acetate gives 2-(4'-thiazolyl)-5-phenyl benzoxazole; M.P. 159–160° C.

When the above process is carried out using thiazole-2- carboxylic acid instead of thiazole-4-carboxylic acid, 2-(2'-thiazolyl)-5-phenyl benzoxazole is obtained.

When instead of 2-amino-4-phenylphenol in the above process there is used 2-amino-4-(4'-fluorophenyl)phenol, there is obtained 2-(4'-thiazolyl)-5-(4'-fluorophenyl) benzoxazole.

EXAMPLE 11

2-(4'-thiazolyl)-6-phenyl benzoxazole

A solution of 2.5 gm. of 2-amino-5-phenylphenol in 20 ml. of pyridine is treated with thiazolyl chloride prepared from 1.8 gm. of thiazole-4-carboxylic acid. The mixture is heated on the steam cone for a half hour, cooled and poured into water. The product is extracted with benzene. The extracts are combined and washed with dilute hydrochloric acid and then with water. At this point crystallization begins. Cooling and filtration give 2.4 gm. of material melting at 233–234° C. Evaporation of the mother liquor gives a residue which weighs 0.9 gm. and melts at 194–200° C.

One and a half gm. of thiazoloyl aminophenol is suspended in 150 ml. of xylene and an equal amount of p-toluene sulfonic acid is added. The mixture is refluxed and soon becomes homogeneous. After five hours the mixture is cooled and washed with 10% sodium bicarbonate. The solution is then dried over magnesium sulfate and evaporated to a residue under vacuum. The residue is boiled for a short while in Skelly Solve B and then filtered to give 950 mg. of product melting at 165–171° C. It is recrystallized from acetone to give 400 mg. of 2-(4'-thiazolyl)-6-phenyl benzoxazole which melts at 174–175° C.

When 1,2,3-thiadiazole-4-carboxylic acid is used instead of thiazole-4-carboxylic acid in the above process, there is obtained 2-(4'-1',2',3'-thiadiazolyl)-6-phenyl benzoxazole.

EXAMPLE 12

2-(2'-thienyl)-6-phenyl benzoxazole

To 5 gm. of 2-nitro-5-phenylphenol (0.023 mole) in 50 ml. of pyridine is added 0.039 mole of 2-thenoyl chloride. The mixture is warmed on a water bath, stirred for one hour, cooled and diluted with water. The product crystallizes and is filtered. On recrystallization from ethyl acetate-petroluem ether, 7.1 gm. (94%) of 0-(2'-thenoyl)-2'-nitro-5-phenylphenol, M.P. 127–128° C., is obtained.

The above product is then dissolved in 140 ml. of glacial acetic acid and diluted with 21 ml. of water and 14 ml. of concentrated HCl. Zinc dust (21 gm.) is then cautiously added. On warming, a dark solution appears. After about ½ hour on the steam bath the solution becomes light colored. The zinc is then filtered out, washed with acetic acid, and the filtrate is diluted with water. The product, N-(2'-thenoyl)-2-amino-5-phenylphenol crystallizes. On recrystallization from ethyl-water 5.2 gm. (80%) of product is obtained.

4 gm. of the N-thenoyl phenylphenol is dissolved in 300 ml. of xylene and 4 gm. of para toluene sulfonic acid is then added. The mixture is refluxed for 3 hours, cooled, washed with 10% sodium bicarbonate, dried over magnesium sulfate, and concentrated. The residue is dissolved in benzene and chromatographed on an alumina column. Elution with benzene gives fractions with crystals. On evaporation of the solvent, recrystallization from Skelly Solve B and ethanol gives 2.1 gm. (56%) of 2-(2'-thienyl)-6-phenyl benzoxazole, M.P. 108–109.5° C.

When using the assay procedure discussed hereinabove, 0.0125% of this product permitted a substantial decrease in lung lesions created by the ascarid when comparing the untreated control animals to the treated mice.

EXAMPLE 13

2-(4'-isothiazolyl)-5-phenyl benzoxazole

Forty gm. (0.3 mole) of isothiazole-4-carboxylic acid is converted to the acid chloride by heating with thionyl chloride. The crude acid chloride is then mixed with 50 gm. (0.25 mole) of 4-phenyl-o-aminophenol in 100 ml. polyphospheric acid and heated with stirring at 175° C. for 2 hours. The reaction mixture is quenched in 500 cc. of water. The product is separated by filtration, washed with sodium hydroxide solution to neutrality and finally the 2-(4'-isothiazolyl)-5-phenyl benzoxazole is recrystallized from ethyl acetate.

EXAMPLE 14

2-(2'-furyl)-5-phenyl benzoxazole 4.6 gm. of 2-amino-4-phenylphenol and 4 ml. of furoyl chloride are heated together without solvent in an oil bath at 200° C. and atmospheric pressure. After 30 minutes, the excess furoyl chloride is removed in vacuo. The black residue is then heated (in vacuo) with a free flame for 10 minutes. The black residue is then chromatographed on 150 gm. of acid-washed alumina and eluted with ether. Two 250 ml. portions remove 3.2 gm. of material, M.P. 105° C. These fractions are combined and recrystallized from ethyl acetate/petroleum ether giving a material having an M.P. of 107–108° C.

EXAMPLE 15

2-(4'-thiazolyl)-6-phenyl benzothiazole

A sample of 2-mercapto-4-phenylaniline (20.1 gm., 0.1 mole) (its equivalent weight of the sodium salt may also be used in 50 ml. dry pyridine) is treated with cooling with 15 gm. of thiazole-4-carboxylic acid chloride. Following the initial reaction, the mixture is heated to reflux for one hour. The excess solvent is then removed in vacuo and the residue is heated to 150° C. in 5 parts by weight of polyphosphoric acid. After cooling the solution is quenched in water, the filtered product neutralized with aqueous sodium hydroxide, washed with water, dried and recrystallized from ethanol. A colorless crystalline portion of 2-(4'-thiazoyly)-6-phenyl benzothiazole is obtained.

When the above process is carried out using 2-mercapto-4-(4'-fluorophenyl) aniline instead of 2-mercapto-4-phenylaniline, there is obtained 2-(4'-thiazolyl)-6-(4'-fluorophenyl) benzothiazole.

EXAMPLE 16

2-(4'-thiazolyl)-6-phenyl benzothiazole

Two gm. of thiazole-4-carboxylic acid and 4 gm. of the zinc salt of 2-mercapto-4-phenylaniline are added to 40 gm. of polyphosphoric acid. This mixture is heated to 180° C. with stirring in a nitrogen atmosphere for two hours. It becomes homogeneous and dark. On being poured into a few hundred ml. of ice water and stirred, the reaction mixture gives a tan-colored precipitate. This is filtered and washed with water and with 5% $Na_2CO_3$.

The product is dissolved in benzene and the solution is dried and charcoaled. The solution, still colored, is passed through a short column of alumina and this is eluted with benzene, ether and chloroform. On evaporation the benzene and ether gives a residue containing the benzothiazole. The residue is combined and boiled in three successive portions of Skelly Solve B. Evaporation of the resulting solutions still gives impure residue.

All of the residue (total wt. 1100 mg.) is dissolved in benzene and the solution is diluted to 75% with petroleum ether. This is put through a column of basic alumina which is then eluted with successive mixtures of benzene-petroleum ether containing from 75% to 100% benzene. 80% benzene-petroleum ether removes 160 mg. of a material melting at 222–223° C. This is followed in later fractions by 690 mg. of 2-(4'-thiazolyl)-6-phenyl benzothiazole at 186–187° C.

The minor product, M.P. 222–223° C., is a monochloro derivative identified as 2-(4'-thiazolyl)-4-chloro-6-phenyl benzothiazole.

EXAMPLE 17

2-(2'-furyl)-6-phenyl benzothiazole 100 gm. (0.5 mole) of 4-phenyl-o-aminobenzenethiol in 150 ml. pyridine is mixed with 50 gm. (about 0.5 mole) of furfural. The stirred mixture is heated to 90° C. for one hour. After cooling, the reaction mixture is added with stirring to 800 ml. of 3 N HCl. The crude benzothiazoline derivative is removed by filtration, washed and then suspended in alcohol. A solution of 50 gm. ferric chloride 100 ml. of alcohol over a half hour period is added in small portions to the stirred refluxing solution. After an additional 30 minute period, it is diluted with an equal volume of water and chilled in ice. The crude product is filtered, washed with water and recrystallized from alcohol.

EXAMPLE 18

2-(2'-furyl)-6-phenyl benzothiazole 5 gm. of aminobiphenyl dissolved in a mixture of 50 ml. of benzene and 5 ml. of pyridine is treated with 5 gm. of furoyl chloride in benzene. The reaction mixture is stirred for a short time until the product begins to crystallize.

The mixture is afterwards diluted with chloroform until solution occurs. The solution is washed with water, dilute HCl, water, 10% $NaHCO_3$ and water, respectively. It is dried over $MgSO_4$ and concentrated to a residue which crystallizes. It is recrystallized from benzene to give 5.5 grams of N-(2'-furoyl)-4-aminobiphenyl, M.P. 174–175° C.

5 gm. of N-(2'-furoyl)-4-aminobiphenyl and 3 gm. of phosphorous pentasulfide are refluxed overnight in 45 ml. of pyridine. The solution is poured into water neutralized with dilute NaOH and extracted with benzene. The extracts are combined, washed with water, dried over $MgSO_4$ and concentrated to a residue. The residue is recrystallized from ethyl acetate-petroleum ether to give 3.4 gm. of N-(2'-thiofuroyl)-4-aminobiphenyl, M.P. 143–145° C.

2.4 grams of N-(2'-thiofuroyl)-4-aminobiphenyl is suspended in 50 ml. of 2 N NaOH and wet with alcohol. 50 ml. of 20% $K_3Fe(CN)_6$ is added and the mixture covered with 100 ml. of Skelly Solve B. The reaction is stirred at room temperature overnight.

The mixture is filtered and the organic layer is separated. The aqueous layer and the precipitate are extracted with more Skelly Solve B, which is added to the organic layer. The combined solution is dried, charcoaled and concentrated to a small volume. 2-(2'-furyl)-6-phenyl benzothiazole (1.2 gm., M.P. 114–116° C.) crystallizes. It is dissolved in chloroform and put through a short colum of alumina. The eluate is concentrated to a residue which is recrystallized from methanol water (0.99 gm., M.P. 118–119° C.).

EXAMPLE 19

2-(2'-thienyl)-6-phenyl benzothiazole

To 20.1 gm. (0.1 mole) of 4-phenyl-o-aminobenzenethiol in 50 ml. pyridine is added 12.3 gm. (0.11 mole) of 2-thenaldehyde. The mixture is heated under reflux with stirring in a bath at 100° C. After one hour, the reaction mixture is cooled and poured into 300 ml. of 2 N HCl. After the crude 2-(2'-thienyl)-6-phenyl benzothiazole has crystallized from the cold quench, the product is filtered and washed with water. An alcohol solution of the benzothiazole is then treated with a molar excess (8 gm.) of $FeCl_3$ in 25 cc. of alcohol. After a half hour period of heating, the product is recovered by quenching the reaction mixture in 2 volumes of cold water. The recovered 2-(2'-thienyl)-6-phenyl benzothiazole is purified by recrystallization from ethyl acetate.

EXAMPLE 20

2-(4'-thiazolyl)-5(6)-(2'-fluorophenyl) benzimidazole hydrochloride

To a solution of 0.68 gm. (0.004 mole) of 2-fluorobiphenyl in 10 ml. of glacial acetic acid is added 5 ml. of concentrated sulfuric acid. The mixture is cooled to 30° C. and 0.7 gm. (0.07 mole) of fuming nitric acid is added. The reaction mixture is poured into ice water and extracted with ether. The ether extract is washed, dried, and concentrated, leaving 0.9 gm. of an oily residue. This oil is chromatographed on 40 gm. of basic alumina. The eluate removing the desired compound is concentrated and the residue crystallized twice from an alcohol-water mixture giving 150 ml. of 2-fluoro-4'-nitrobiphenyl, M.P. 82–82.5° C.

A solution of 2.6 gm. of the nitrobiphenyl in 50 ml. of methanol is reduced at 40 p.s.i. and room temperature with 0.5 gm. of 5% palladium on Darco as a catalyst. The catalyst is filtered and the filtrate concentrated to dryness at reduced pressure leaving 2–3 gm. of 2-fluoro-4'-aminobiphenyl, an oil residue.

A mixture of 2.27 gm. (0.012 mole) of 2-fluoro-4'-aminobiphenyl, 1.32 gm. (0.012 mole) of 4-cyanothiazole in 1.62 gm. (0.0012 mole) of anhydrous aluminum chloride in 30 ml. of dry tetrachloroethane is stirred and poured into a cool solution of 10 gm. of sodium hydroxide and 150 ml. of water. The layers are separated and the aqueous phase extracted with methylene chloride. The combined organic phases are washed, dried and concentrated leaving an oily residue which is dissolved in a small quantity of methanol and diluted with water. This mixture is extracted with ether acetone, which extract is dried and concentrated giving 2.5 gm. of crude N-2-fluorobiphenyl (thiazole)-4-amidine, M.P. 120–124° C. After recrystallization from a mixture of ethanol and water, the material melts at 151–152° C.

A suspension of 1.7 gm. of the amidine in 50 ml. of methanol is brought into solution at pH 3.5–4 by the addition of concentrated hydrochloric acid. To the solution is added 2.0 ml. of 3 M sodium hypochlorite. After 3 minutes at room temperature, a solution of 0.35 gm. of sodium hydroxide in 2 ml. of water is added and the mixture refluxed for 10 minutes. The solution is cooled and adjusted to pH 2 by the addition of concentrated hydrochloric acid. The product then begins to crystallize and 0.85 gm. (45%) of 2-(4'-thiazolyl)-5(6)-(2'-fluorophenyl) benzimidazole hydrochloride, M.P. 245° C., transition point 145° C., is obtained.

EXAMPLE 21

2-(4'-thiazolyl)-5(6)-(4'-chlorophenyl) benzimidazole hydrochloride

A mixture of 4.1 gm. (0.02 mole) of 4-amino-4'-chlorobiphenyl, 2.2 gm. (0.02 mole) of 4-cyanothiazole and 2.7 gm. (0.02 mole) of anhydrous aluminum chloride in 50 ml. of tetrachloroethane is stirred and refluxed for 20 minutes and then allowed to cool. The solvent is decanted and the gummy residue dissolved in 60–70 ml. of methanol. The solution is added to 20 gm. of sodium hydroxide in 300 ml. of water. The yield of N-(4-chlorobiphenyl)-(thiazole-4-amidine), M.P. 188–191° C., is 5.2 gm. (83%).

A suspension of 1.37 gm. (0.0043 mole) of N-(4'-chlorobiphenyl)-(thiazole-4-amidine) in 50 ml. of methanol is brought into solution at pH 3.5 by the addition of concentrated hydrochloric acid. To this solution is added 1.6 ml. (0.0043 mole) of 2.8 M sodium hypochlorite. The solution is allowed to stand for 3 minutes at room temperature. 0.3 gm. of sodium hydroxide in 1 ml. of water is added and the solution is refluxed for 10 minutes, cooled and acidified with hydrochloric acid. It is then heated and filtered from a small amount of gummy material. The filtrate, on being cooled, deposits 1.35 gm. of 2-(4'-thiazolyl)-5(6)-(4'-chlorophenyl) benzimidazole hydrochloride, M.P. >250° C.

EXAMPLE 22

2-(4'-thiazolyl)-5(6)-(4'-fluorophenyl) benzimidazole hydrochloride

A mixture of 10.0 gm. (0.053 mole) of 4-fluoro-4'-aminobiphenyl, 5.8 gm. (0.053 mole) of 4-cyanothiazole, and 7.2 gm. (0.053 mole) of anhydrous aluminum chloride in 100 ml. of dry tetrachloride is stirred and refluxed for 15 minutes. The mixture is cooled and the supernatant liquid decanted. The residue is dissolved in 150 ml. of methanol and this solution added to a solution of 50 gm. of sodium hydroxide in 750 ml. of water. The product is extracted with ether, which extract is washed with water, dried and concentrated, giving 7.4 gm. (47%) of crude amidine. Recrystallization of a sample of the amidine from ethanol, raises the melting point to 157° C.

A mixture of 1.3 gm. (0.0044 mole) of N-p-fluorobiphenyl-(thiazole-4-amidine) in 20 ml. of methanol is adjusted to pH 4.5 by the addition of concentrated hydrochloric acid. To the solution is added 2.8 ml. (0.0044 mole) of 1.57 M sodium hypochlorite solution. After about 3 minutes a solution of 0.3 gm. of sodium hydroxide in 3 ml. of water is added and the mixture stirred and refluxed for 15 minutes. The mixture is adjusted to pH 3 by the addition of concentrated hydrochloric acid at which time the product begins to separate. The yield of 2-(4'-thiazolyl)-5(6)-(4'-fluorophenyl) benzimidazole hydrochloride, M.P. about 200° C. with a transition at 145° C., is 1.2 gm. (80%).

EXAMPLE 23

2-(4'-thiazolyl)-5(6)-(2'-naphthyl) benzimidazole

To a solution of 0.58 gm. of 2-(p-aminophenyl) naphthylene and 0.29 gm. of 4-cyanothiazole is added 0.35 gm. of $AlCl_3$ during vigorous stirring. The dark mixture is then heated 20 minutes at reflux, allowed to cool, the supernatant liquid decanted, and the remaining dark solid dissolved in methanol. The methanol solution is added slowly to stirred 4 N NaOH (75 ml.) and the tan solid which forms is collected by filtration, washed with ether, benzene and water, and dried in vacuo. The product (0.26 gm.) has a melting point greater than 300° C.

To a suspension of 170 mg. of the amidine prepared above in 15 ml. of 50% methyl alcohol-water is added HCl until the pH of 4.5 is achieved. To the stirred mixture is added 0.38 ml. of 1.35 N NaOCl. The resulting solution is stirred 3 minutes then 1 ml. of water containing 25 mg. of NaOH is added. The mixture is then heated at reflux for 20 minutes and allowed to cool to room temperature. Evaporation in vacuo is effected until the methanol has been removed leaving a brown solid suspended in the water. This solid is then centrifuged and dried, giving 150 mg. of material which has a melting point of about 150° C.

EXAMPLE 24

4-(4'-methoxyphenyl)-o-nitroaniline

A solution of 68 gm. of 4-phenylphenol in 250 ml. of pyridine at 10° C. is treated with 62 gm. of benzoyl chloride. The temperature of the reaction mixture is raised to 60° C. for ½ hour and then to boiling for ½ hour. The solution is allowed to cool and the product is crystallized. The mixture is added to 2 l. of water and an excess of concentrated hydrochloric acid is added. The resulting white solid is filtered, washed and dried giving 4-phenylphenyl benzoate; M.P. 150–152° C.

A solution of 53 gm. of 4-phenylphenyl benzoate in 410 ml. of glacial acetic acid at 90° C. is treated with 133 ml. of fuming nitric acid. The temperature is maintained at 90° C. during the addition. The mixture is allowed to cool to room temperature and the solid is filtered and washed with acetic acid. The solid is then digested with 750 ml. of boiling acetic acid. The mixture is cooled to 40° C., the supernatant liquor is decanted, and the solid is filtered, washed and dried giving 4'-nitro-4-phenylphenyl benzoate; M.P. 215–216.5° C.

A suspension of 6 gm. of 4'-nitro-4-phenylphenyl benzoate in 30 ml. of ethanol is heated to boiling and a solution of 4 gm. of potassium hydroxide in 10 ml. of water is slowly added. After 15 minutes the mixture is cooled and the potassium salt of 4-hydroxy-4'-nitrobiphenyl is obtained. This salt is suspended in 100 ml. of hot water and the mixture acidified with concentrated hydrochloric acid. The mixture is then cooled and the yellow solid, 4-hydroxy-4'-nitrobiphenyl, is filtered; M.P. 204–206° C.

A hot solution of 3.9 gm. of 4-hydroxy-4'-nitrobiphenyl and 2 gm. of potassium hydroxide in 50 ml. of water is treated with an excess of dimethyl sulfate in increments. The solution is kept alkaline by the addition of more potassium hydroxide. The yellow solid is filtered and immediately recrystallized from 50 ml. of ethanol, giving 4-methoxy-4'-nitrobiphenyl; M.P. 105–107° C. A second recrystallization from ethanol raises the melting point to 109–109.5° C.

A mixture of 2.8 gm. of 4-methoxy-4'-nitrobiphenyl, 15 ml. of acetic acid, 15 ml. of acetic anhydride, and 0.5 gm. of 5% palladium adsorbed on carbon as catalyst is reduced by hydrogen at 40 p.s.i. at room temperature. The catalyst is filtered and the filtrate concentrated to dryness at reduced pressure. The solid residue is recrystallized from 50 ml. of ethanol giving 4-(4'-methoxyphenyl) acetanilide; M.P. 207–208° C.

A solution of 1 gm. of 4-(4'-methoxyphenyl) acetanilide in 6 ml. of glacial acetic acid and 6 ml. of acetic anhydride is treated at 50° C. with a solution of 0.35 gm. of fuming nitric acid in 3 ml. of glacial acetic acid over a 15–20 minute period. The temperature is maintained at 50° C. for an additional 15 minutes and the solution is poured into 150 ml. of water. Filtration and recrystallization from ethanol gives 4-(4'-methoxyphenyl)-o-nitroacetanilide; M.P. 136–137° C.

A mixture of 0.53 gm. of 4-(4'-methoxyphenyl)-o-nitroacetanilide, 10 ml. of ethanol and 5 ml. of concentrated hydrochloric acid is refluxed for 10 minutes. Solution is obtained and the product then begins to separate. It is filtered, washed and dried giving 4-(4'-methoxyphenyl)-o-nitroaniline; M.P. 166–168° C.

EXAMPLE 25

Acid addition salts

When the benzimidazoles described herein are isolated as the free bases, they are readily converted to acid addition salts by treatment with acid. Typical salts which may be formed in this manner are mineral acid salts such as the hydrohalides, e.g., hydrochloride, hydrobromide, hydroiodide, sulfates, nitrates, phosphates and the like, aliphatic acid salts such as the acetate, trimethylacetate and propionate, salts of polycarboxylic acids such as the citrate, oxalate, succinate, and the like and salts of other insoluble organic acids such as the pamoate, embonate, and hydroxynaphthoate salts. Some of these salts are more water soluble and some less water soluble than the free bases. It will be seen, therefore, that the solubility properties of a particular benzimidazole may be generally adjusted by judicious selection of a salt. When the benzimidazoles of this invention are used in salt form as anthelmintics, it is desirable that the particular acid employed be edible and non-toxic.

When 2-(4'-thiazolyl)-5(6)-phenyl benzimidazole is dissolved in ethanol and an excess of ethanolic hydrogen chloride and ethyl ether is added thereto, cooling and filtering of the mixture gives crystals of the hydrochloride acid addition salt of the benzimidazole.

EXAMPLE 26

2-(4'-thiazolyl)-5(6)-(4'-imidazolyl)-benzimidazole

A suspension of 0.84 gm. (0.0027 mole) of N-[4'-(4-imidazolyl)] - 2' - nitro - 4' - thiazolecarboxanilide, prepared by reaction of thiazole-4-carboxylic acid chloride and 4-(4'-aminophenyl) imidazole and nitrating with nitric acid, in 150 ml. of methanol and 1.3 ml. of concentrated hydrochloric acid is reduced at room temperature and 40 p.s.i. with 0.5 gm. of 5% palladium over activated charcoal as catalyst. The solution is filtered from the catalyst and concentrated to dryness at reduced pressure. The residue is redissolved in a mixture of 25 ml. of water, 25 ml. of ethanol, and 2.5 ml. of concentrated hydrochloric acid, and the solution refluxed for 4 hours. It is concentrated to dryness at reduced pressure. The residue is dissolved in alcohol and an excess of ether is added giving 2 - (4' - thiazolyl) - 5(6) - (4' - imidazolyl) benzimidazole.

EXAMPLE 27

2-(4'-thiazolyl)-5(6)-(1'-imidazolyl) benzimidazole

To thiazole-4-carboxylic acid chloride is added 200 ml. of toluene and 15.9 gm. of 1-(4'-aminophenyl) imidazole and the mixture is heated for 1 hour at reflux. The resulting solid is filtered giving 26.1 gm., M.P. 250° C. The product is then nitrated and reduced with palladium over carbon to yield the corresponding amine which is then dissolved in a mixture of 5 ml. of water, 5 ml. of ethyl alcohol and 5 ml. of concentrated HCl. The solution is treated at reflux for 3 hours, made neutral with concentrated ammonium hydroxide and evaporated to one half of the original volume. The resulting tan solid, 2-(4'-thiazolyl)-5(6)-(1'-imidazolyl) benzimidazole, is then filtered and dried; M.P. 239–240° C.

When the above process is carried out employing 4-(4'-aminophenyl) thiazole instead of 1-(4'-aminophenyl) imidazole, 2-(4'-thiazolyl)-5(6)-(4'-thiazolyl) benzimidazole results.

When 2-(2'-aminophenyl) thiophene is used in place of 1-(4'-aminophenyl) imidazole in the above process, 2-(4'-thiazolyl)-5(6)-(2'-thienyl) benzimidazole is recovered as the product.

On the other hand, when the above process is carried out employing thiazole -2-carboxylic acid chloride, 1,2,5 thiodiazolyl-4-carboxylic acid chloride, isothiazole-4-carboxylic acid chloride, 2-furoic acid chloride, 3-thenoic acid chloride, or pyrole -2-carboxylic acid chloride instead of thiazole-4-carboxylic acid chloride, there is obtained 2-(2'-thiazolyl)-5(6)-(4'-thiazolyl) benzimidazole, 2-(4'-1,2,5 thiodiazolyl)-5(6)-(4'-thiazolyl) benzimidazole, 2-(4'-isothiazolyl)-5(6)-(4'-thiazolyl) benzimidazole, 2-(2'-furyl)-5(6)-(4'-thiazolyl) benzimidazole, 2-(3'-thienyl)-5(6)-(4'-thiazolyl) benzimidazole, or 2-(2'-pyrryl)-5(6)-(4'-thiazolyl) benzimidazole, respectively.

EXAMPLE 28

2-(4'-thiazolyl)-5(6)-(2'-thiazolyl) benzimidazole

To a solution of 1.06 gm. (9.6 M mole) of 4-cyanothiazole and 1.69 gm. 2-(4'-aminophenyl) thiazole in 10 ml. of tetrachloroethane is rapidly added with stirring 1.28 gm. (9.6 M mole) of aluminum chloride. The mixture is stirred at reflux for 20 minutes, allowed to cool and treated with 20 ml. of 5 NaOH. The black solid which forms is then separated by filtration and is completely dissolved by the addition of 50 ml. of methyl alcohol. The methyl alcohol solution is then added dropwise for 20 minutes to a stirred 5 NaOH solution (75 mole). The mixture is then stirred for 5 minutes, filtered and dried, giving tan crystalline amidine having a melting point of 146–150° C. Recrystallation from water ethanol gives N-4(2'-thiazolyl) phenyl-(thiazole-4-amidine) melting at 150–153° C.

To a stirred solution of 500 mg. (1.75 M mole) of the amidine formed above in 5 ml. of methyl alcohol and 5 ml. of water adjusted to pH 4.5 with concentrated HCl is added ultimately 0.66 ml. of 2.89 N NaOCl. A solid precipitates. After stirring for 5 minutes, 0.084 gm. (2.11 mole) NaOH in 1 ml. of water is added. When heated to reflux almost complete solution of the solid results. Solution is then filtered and the filtrate allowed to cool at which time an oil deposits turning crystalline upon the addition of concentrated HCl; M.P. 202–206° C. Recrystallization from water hydrochloric acid gives the desired product melting at 206–207° C.

EXAMPLE 29

2-(4'-thiazolyl)-5(6)-(5'-thiazolyl) benzimidazole

To a solution of 1.14 gm. of 4-cyanothiazole in 4 ml. of tetrachloroethane is added 1.8 gm. 5-(4'-aminophenyl) thiazole. To this mixture 1.37 gm. of AlCl₃ is added with stirring. The resulting mixture is stirred at reflux for 25–30 minutes and when cooled a tan syrup which completely dissolves in 25 ml. of methyl alcohol results. The methyl alcohol is added dropwise to a stirred solution of 5 N sodium hydrochloride (75 ml.). The tan crystalline solid which forms, N-4(5'-thiazolyl) phenyl-thiazole-4-amidine, has a melting point of 175–177° C.

To a mixture of 25 ml. of methyl alcohol 10.9 gm. of the amidine formed above is added sufficient 50% HCl in methyl alcohol to bring the pH to 4. To the solution which results is added 1.33 ml. (2.92 ml.) of NaOCl with stirring for 10 minutes. Then 0.17 gm. of NaOH in 1 ml. of water is added and the solution heated at reflux for 45 minutes. The methyl alcohol is then reduced in volume to about 30% of the original and about 1 ml. of concentrated HCl. The desired product forms and is allowed to stand overnight at 10° C.; M.P. 230–232° C.

EXAMPLE 30

2-(4'-thiazolyl)-5(6)-(4'-thiazolyl) benzimidazole

To 10 ml. of tetrachloroethane is added 1.37 gm. (7.78 M mole) of 4-(4'-aminophenyl) thiazole and 0.80 gm. (7.78 M mole) of 4-cyanothiazole. To the stirred solution is added 1.04 gm. of AlCl₃ and the resulting solution is stirred at reflux for 1 hour at which time an oily residue is noted. The solvent is indicated and the residue dissolved in 20 ml. of methyl alcohol. This brown solution is added to 100 ml. of 4 NaOH with stirring. The resulting precipitate is filtered and washed with water. Upon double recrystallization from ethanol water, a melting point of 157–158° C. is displayed.

4 gm. of the above-produced amidine in 25 ml. of methyl alcohol is adjusted to pH 4.5 with concentrated HCl. To this yellow solution is added 5 ml. of N NaOCl. The dark resulting mixture is stirred for 5 minutes; 60 gm. of sodium hydroxide is added and the mixture heated at reflux for 45 minutes, the solvent removed in vacuo and the residue dissolved in 15% HCl. Concentrated NH₄OH is added to precipitate the desired benzimidazole; M.P. 135–140° C.

When 2-(4'-aminophenyl) pyrrole, 4-(4'-aminophenyl) isothiazole, 4-(4'-aminophenyl)-1,2,5-thiadiazole or 2-(4'-aminophenyl) furan is used in place of 4-(4'-aminophenyl) thiazole in the process above, there is obtained 2-(4'- thiazolyl)-5(6)-(2'-pyrryl) benzimidazole, 2-(4'-thiazolyl)-5(6)-(4'-isothiazole) benzimidazole, 2-(4'-thiazolyl)-5(6)-(4'-1',2',5'-thiadiazole) benzimidazole or 2-(4'-thiazolyl)-5(6)-(2'-furyl) benzimidazole, respectively.

EXAMPLE 31

2-(4'-thiazolyl)-5-(2'-thiazolyl) benzoxazole

To thiazole-4-carboxylic acid chloride is added a solution of 3.6 gm. of 2-amino-4-(2'-thiazolyl) phenol in 40 ml. of pyridine. The mixture is heated on a steam cone for about 30 minutes and is then cooled and extracted with benzene. The extract is washed with dilute hydrochloric acid and water and is then chilled and filtered giving N-(4'-thiazolyl-2-hydroxy-5-(2'-thiazolyl) anilide. The intermediate anilide is suspended in 150 ml. of xylene to which is added an equal amount of p-toluene sulfuric acid. The mixture is refluxed for 5 hours, washed with 10% sodium bicarbonate, dried over magnesium sulfate and evaporated to a residue under vacuum giving 2-(4'-tniazolyl)-5-(2'-thiazolyl) benzoxazole.

When the above process is carried out and 2-amino-4-(2'-thiazolyl) thiophenol is used in place of 2-amino-4-(2'-thiazolyl) phenol, 2-(4'-thiazolyl)-5-(2' - thiazolyl) benzothiazole.

EXAMPLE 32

Acid addition salts

When the benzimidazoles described herein are isolated as the free bases, tney are readily converted to acid addition salts by treatment with acid. Typical salts which may be formed in this manner are mineral acid salts such as the hydrohalides, e.g., hydrochloride, hydrobromide, hydroiodide, sulfates, nitrates, phosphates and the like, aliphatic acid salts such as the acetate, trimethylacetate, and propionate, salts of polycarboxylic acids such as the citrate, oxalate, succinate, and the like and salts of other insoluble organic.

The preferred halogenating agents, however, are hypochlorous and hypobromous acid. These are conveniently formed in situ by addition of an alkali or alkaline earth metal hypohalite to a solution of the N'-phenylamidine acid addition salt, whereby neutralization of the acid addition salt and generation of the halogenating agent occur concurrently. Typical hypohalites useful for this purpose are sodium or potassium hypochlorite, sodium hypobromite and calcium hypobromite.

The N-halo-N'-phenyl amidine resulting from the above halogenation is converted to the benzimidazole by treatment with a base, such as an alkali or alkaline earth metal hydroxide such as sodium hydroxide, potassium hydroxide or calcium hydroxide.

One method of obtaining the 1-substituted benzimidazole of Formula I above is by converting the non-1-substituted compound to an alkali metal salt, preferably the sodium salt, by intimately contacting said compound with sodium hydride in a suitable solvent. A slight molar excess of sodium hydride gives satisfactory results and equimolar quantities of benzimidazole and sodium hydride may also be used if desired. The reaction is conveniently brought about by warming the reactants at slightly elevated temperatures, but room temperature gives satisfactory results.

A 1-substituted benzimidazole may then be obtained by contacting the benzimidazole alkali metal salt with an acyl halide such as benzoyl chloride, acetyl chloride, acetyl bromide, propionyl chloride and the like, an the pamoate, embonate and hydroxynaphthoate salts. Some of these salts are more water soluble and some less water soluble than the free bases. It will be seen, therefore, that the solubility properties of a particular benzimidazole may be generally adjusted by judicious selection of a salt. When the benzimidazoles of this invention are used in salt form as anthelmintics, it is desirable that the particular acid employed be edible and non-toxic.

When 2-(4'-thiazolyl)-5(6)-(1'-imidazolyl) benzimidazole is dissolved in ethanol and an excess of ethanolic hydrogen chloride and ethyl ether is added thereto, cooling and filtering of the mixture gives crystals of the hydrochloride acid addition salt of the benzimidazole.

EXAMPLE 33

1-benzoyl-2-(4'-thiazolyl)-5-(1'-imidazolyl) benzimidazole

A 1:1 benzene-dimethylformamide mixture is added to 15 gm. of 2-(4'-thiazolyl)-5(6)-(1'-imidazolyl) benzimidazole in a quantity sufficient to give substantial solution at reflux. Some benzene is distilled off and 0.06 M of sodium hydride suspended in dry benzene is added. The reaction mixture is stirred for about ½ hour and the sodium salt of the benzimidazoles forms. 8 gm. of benzoyl chloride in 10 ml. of dry benzene is added dropwise to the sodium salt and after 30 minutes of stirring at gentle reflux the reaction mixture is cooled, diluted with dry toluene and the organic layer is washed with cold water. The solution is then dried over magnesium sulfate, filtered concentrated giving 1-benzoyl-2-(4'-thiazolyl-5-(1'-imidazolyl) benzimidazole.

If acetyl chloride is used in place of benzoyl chloride in the above process, 1-acetyl-2-(4'-thiazolyl)-5-(1'-imidazolyl) benzimidazole will result.

When benzyl chloride or methyl chloride is used in place of benzoyl chloride in the above process, there will result 1-benzyl-2-(4'-thiazolyl)-5-(1'-imidazolyl) benzimidazole or 1-methyl-2-(4'-thiazolyl)-5 - (1' - imidazolyl) benzimidazole, respectively.

EXAMPLE 34

1-(4'-aminophenyl) imidazole

To a solution of 33.5 gm. of imidazole in 150 ml. of dimethylformamide is slowly added 26 gm. of sodium hydride. The mixture is stirred for about 30 minutes and it is then added to a solution of 78.8 gm. of p-chloronitrobenzene in 100 ml. of dimethylformamide. After an initial exothermic reaction takes place, the solution is refluxed for 1½ hours and poured into 1.1 of water. The precipitate is filtered, recrystallized from acetone, dissolved again in acetone and recrystallized to give N-(4'-nitrophenyl) imidazole; M.P. 195–198° C.

To 200 ml. of methanol is added 21.2 gm. of N-(4'-nitrophenyl) imidazole, 9.37 ml. of concentrated hydrochloric acid and 10 gm. of palladium adsorbed on carbon catalyst. The mixture is hydrogenated for 1½ hours, filtered and the filtrate concentrated to ⅓ its original volume. The solution is then diluted with 75 ml. of water and recrystallized with ammonium hydroxide. The precipitate formed is filtered and the filtrate evaporated under vacuum. The precipitate formed, N-(4'-aminophenyl) imidazole, melts at 141–143° C.

We claim:

1. A compound selected from the group of compounds having the formulae:

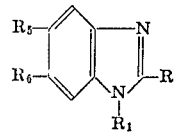

and

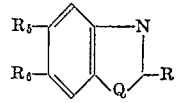

wherein Q is oxygen or sulfur; R represents pyrryl, pyridyl, furyl, thienyl, thiazolyl, isothiazolyl or thiadiazolyl; $R_5$ and $R_6$ represent hydrogen, imidazolyl, thiazolyl, isothiazolyl, thiadiazolyl, thienyl, furyl, pyrryl, naphthyl, phenyl, halophenyl, loweralkylphenyl, loweralkoxyphenyl, loweralkylthiophenyl, loweralkylaminophenyl, and diloweralkylaminophenyl provided one and only one of $R_5$ and $R_6$ is hydrogen; and $R_1$ is a member of the group consisting of hydrogen, loweralkyl, phenylloweralkyl, loweralkanoyl, benzoyl, and phenylloweralkanoyl, and nontoxic acid addition salts thereof.

2. A compound of claim 1 having the formula:

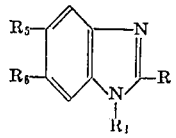

wherein R, $R_1$, $R_5$ and $R_6$ are as defined in claim 1.

3. A compound of claim 1 having the formula:

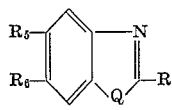

wherein Q is oxygen and R, $R_5$ and $R_6$ are as defined in claim 1.

4. A compound of claim 1 having the formula:

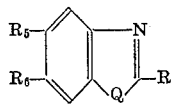

wherein Q is sulfur and R, $R_5$ and $R_6$ are as defined in claim 1.

5. A compound of claim 2 wherein $R_5$ and $R_6$ are hydrogen, imidazolyl, thiazolyl, isothiazolyl, thiadiazolyl, thienyl, furyl, and pyrryl, provided that one and only one of the substituents $R_5$ and $R_6$ is hydrogen.

6. A compound of claim 2 wherein $R_1$ is hydrogen, $R_6$ is hydrogen and $R_5$ is thiazolyl.

7. A compound of claim 2 wherein $R_1$ is hydrogen, $R_6$ is hydrogen and $R_5$ is imidazolyl.

8. A compound of claim 2 having the designation 2-thiazolyl-5(6)-thiazolyl benzimidazole.

9. A compound of claim 2 having the designation 2-(4'-thiazolyl)-5(6)-(4'-thiazolyl) benzimidazole.

10. A compound of claim 2 having the designation 2-(4'-thiazolyl)-5(6)-(2'-thiazolyl) benzimidazole.

11. A compound of claim 2 having the designation 2-thiazolyl-5(6)-imidazolyl benzimidazole.

12. A compound of claim 2 having the designation 2-(4'-thiazolyl)-5(6)-(1'-imidazolyl) benzimidazole.

13. A compound of claim 2 having the designation 2-thiazolyl-5(6)-thienyl benzimidazole.

14. A compound of claim 2 wherein $R_5$ and $R_6$ are hydrogen, naphthyl, phenyl, halophenyl, loweralkylphenyl, loweralkoxyphenyl, loweralkylthiophenyl, loweralkylaminophenyl and diloweralkylaminophenyl, provided that one and only one of the substituents $R_5$ and $R_6$ is hydrogen.

15. A compound of claim 14 wherein $R_1$ and $R_6$ are hydrogen and $R_5$ is phenyl.

16. A compound of claim 14 wherein $R_1$ and $R_6$ are hydrogen and $R_5$ is halophenyl.

17. A compound of claim 14 having the designation 2-thiazolyl-5(6)-phenyl benzimidazole.

18. A compound of claim 14 having the designation 2-(4'-thiazolyl)-5(6)-phenyl benzimidazole.

19. A compound of claim 14 having the designation 2-thiazolyl-5(6)-halophenyl benzimidazole.

20. A compound of claim 14 having the designation 2-(4'-thiazolyl)-5(6)-(4'-fluorophenyl) benzimidazole.

References Cited

UNITED STATES PATENTS

| | | | |
|---|---|---|---|
| 2,985,661 | 5/1961 | Hein et al. | 260—304 |
| 3,017,415 | 1/1962 | Sarett et al. | 260—302 |
| 3,055,907 | 9/1962 | Brown et al. | 200—302 |

ALEX MAZEL, Primary Examiner

R. J. GALLAGHER, Assistant Examiner

U.S. Cl. X.R.

260—294.8, 296, 295, 304, 307, 309.2; 424—263, 270, 272, 273